United States Patent [19]

Watanabe

[11] 4,293,889
[45] Oct. 6, 1981

[54] DEVICE FOR GROUNDING AN ELEVATOR WINDER

[75] Inventor: Eiki Watanabe, Inazawa, Japan

[73] Assignee: Mitsubishi Denki Kabushiki Kaisha, Tokyo, Japan

[21] Appl. No.: 55,837

[22] Filed: Jul. 9, 1979

[30] Foreign Application Priority Data

Jul. 11, 1978 [JP] Japan .................................. 53/84323

[51] Int. Cl.³ ............................................. H02H 1/00
[52] U.S. Cl. ................................... 361/212; 187/1 R; 307/145
[58] Field of Search ....................... 187/1 R, 20, 29 R; 361/220, 221, 212, 216; 307/145

[56] References Cited

U.S. PATENT DOCUMENTS

| | | | |
|---|---|---|---|
| 1,490,271 | 4/1924 | Hecht, Jr. ............................. | 187/1 R |
| 2,125,050 | 7/1938 | Josephs, Jr. et al. ................ | 361/216 |
| 3,317,759 | 5/1967 | Grobel ................................. | 361/212 |
| 3,873,886 | 3/1975 | Kato et al. .......................... | 361/216 |
| 4,059,846 | 11/1977 | Eisenhauer .......................... | 361/212 |

*Primary Examiner*—Robert J. Spar
*Assistant Examiner*—Kenneth Noland
*Attorney, Agent, or Firm*—Sughrue, Mion, Zinn, Macpeak and Seas

[57] ABSTRACT

A device for grounding an elevator winder including an electric motor controlled by a semiconductor switching element and a first rotary element coupled to the electric motor. A main rope is wound on the first rotary element and bearings are adapted to support the electric motor and first rotary element. A first grounding circuit grounds the bearings through a resistor and a second grounding circuit grounds the main rope without using a resistor. The main rope may also be wound around a second rotary element.

8 Claims, 4 Drawing Figures

DEVICE FOR GROUNDING AN ELEVATOR WINDER

BACKGROUND OF THE INVENTION

This invention relates to an improvement of a device adapted to ground an elevator winder.

FIG. 1 shows an elevator winder driven by an electronic motor controlled by a thyristor Leonard system. In FIG. 1, reference characters R, S and T designate a three-phase AC supply and 2a, the armature of a DC motor in which the applied voltage is controlled by a thyristor converter 1 (the field not shown). The shaft 3 of the armature 2a, and a machine supporting stand 4 are set through vibration-proof rubber members 5 in a machine room. A grounding line 6 is used to ground the machine supporting stand 4. Bearings supportings 7 and 8 of the shaft 3 are disposed on the stand 4.

A traction sheave 9 is fixedly mounted on the shaft 3. A secondary sheave 10 is mounted on a shaft 11. Bearings 12 and 13 support the shaft 11 on the machine supporting stand 4. Element 14 is a main rope wound on both of the traction sheave 9 and the secondary sheave 10. A cage 15, a balance weight 16 complete the elevator structure. The capacitance 17 between the armature 2a and the shaft 3 thereof and stray capacitances 18, 19 and 20 between the supply lines and the ground complete the electrical circuit.

The machine supporting stand 4 is grounded through the grounding line 6 in accordance with Electrical Equipment Installation Standards (Japan). Accordingly, the shaft 3, and the bearings 7, 8, 12 and 13 are also grounded.

It is well known in the art that, when an electric motor is controlled by the use of a high-speed switching element such as a thyristor, then shaft current flows in the elecric motor. More specifically, when the thyristor converter 1 is operated, a pulsive current flows through a circuit (R—1—2a—17—3—7—4—6—19—S) as indicated by the arrow A, or a pulsive current flows through a different circuit (R—1— 2a—17—3—9—1-4—10—11—13—4—6—19—S). In general, the bearings 7, 8, 12 and 13 are ball-and-roller bearings. Therefore, when current flows in these bearings, the coating surfaces of the balls or the rollers are electrically peeled off, and the balls or the rollers are quickly damaged.

In order to prevent the flow of the shaft current through the bearings 7, 8, 12 and 13, a grounding brush 22 as shown in FIG. 2, is provided in contact with the shaft 3 of the electric motor 2 with the grounding brush 22 being grounded through a grounding line 23. However, this method is disadvantageous in that it is necessary to extend the shaft 3 outwardly, that is, the overall dimension is increased. Also, the current flowing in the bearings 7, 8, 12 and 13 is not always zeroed depending on the contact resistance of the grounding brush 22, and the maintenance of the brush 22 is troublesome.

SUMMARY OF THE INVENTION

Accordingly, an object of this invention is to eliminate all of the above-described difficulties in the prior art.

More specifically, an object of the invention is to provide a system for grounding an elevator winder, which is simple in construction and in which the shaft current of the electric motor does not substantially flow through the shaft supporting bearings.

It is another object of this invention to provide a system for grounding an elevator where the bearings are protected from damage.

These and other objects of this invention are accomplished in a device for grounding an elevator winder including an electric motor controlled by a semiconductor switching element and a first rotary element coupled to the electric motor. A main rope is wound on the first rotary element and bearings are adapted to support the electric motor and first rotary element. A first grounding circuit grounds the bearings through a resistor and a second grounding circuit grounds the main rope without using a resistor. The main rope may also be wound around a second rotary element.

One example of a device for grounding an elevator winder, according to the invention, will be described with reference to FIG. 3 and a second with respect to FIG. 4.

DESCRIPTION OF THE PREFERRED EMBODIMENTS

Figure 3:
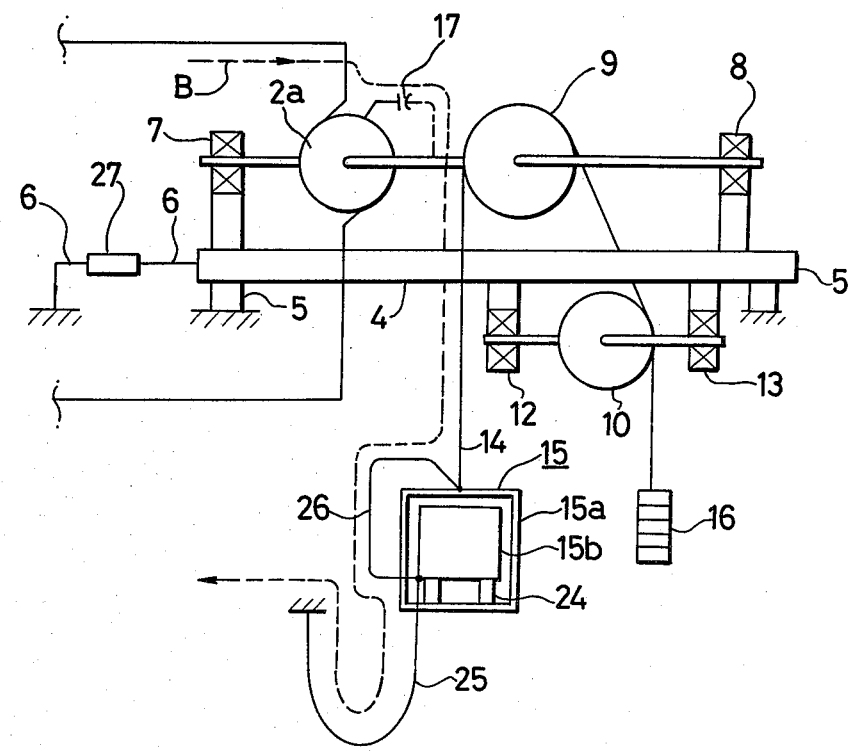
FIG. 3 is an explanatory diagram showing the arrangement of one example of a device for grounding an elevator winder, according to this invention.

In FIG. 3, reference character 15a designates a cage frame and 15b, a cage chamber. Vibration-proof rubber members 24 are disposed between the cage chamber 15b and the cage frame 15a. A movable cable 25 is used for grounding the cage chamber 15b. A grounding line 26 connects a main rope 14 to the movable cable 25. Element 27 is a grounding resistor through which a machine supporting stand 4 is grounded. The resistor 27 has a resistance, usually several ohms, which is permitted in the third or the special third class grounding work of EEIS (Japan). The other components shown in FIG. 3 are similar to those in FIG. 1.

Figure 1:
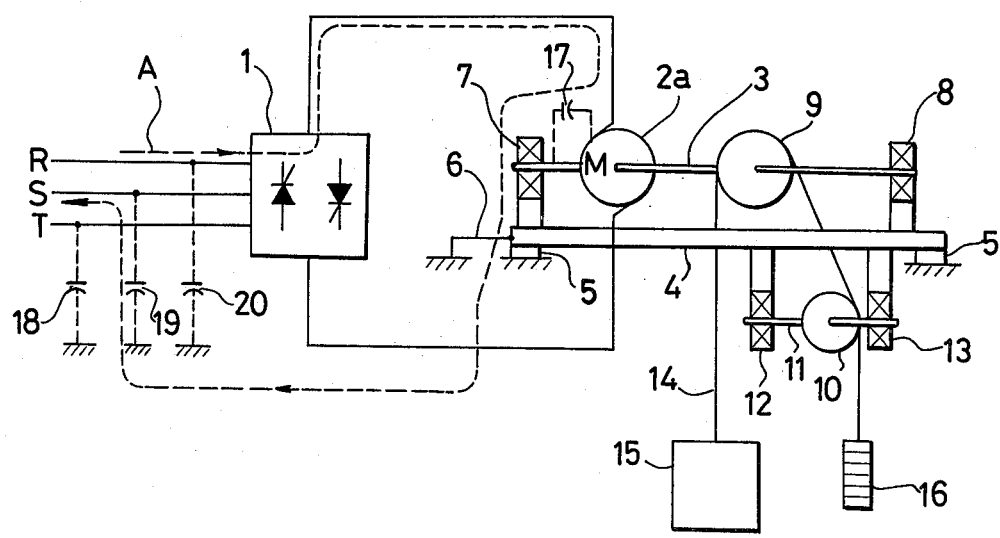
FIG. 1 is an explanatory diagram showing one example of the arrangement of a conventional device for grounding an elevator winder.
Figure 2:
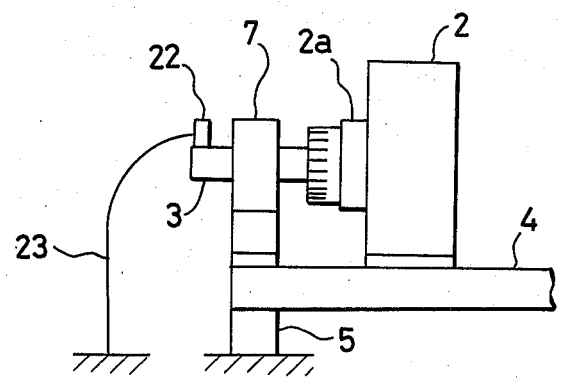
FIG. 2 is a side view showing another example of the conventional device.

In the arrangement shown in FIG. 3, the resistance of the main rope 14 is very low, and therefore the shaft current flows mainly in a circuit (R—1—2a—1-7—3—9—14—26—25—19—S) as indicated by the arrow B. Since the grounding resistor 27 is provided, the shaft current flowing in a circuit indicated by the arrow A in FIG. 1 is very small. Accordingly, the shaft current is negligible in the bearings 7, 8, 12 and 13.

Figure 4:
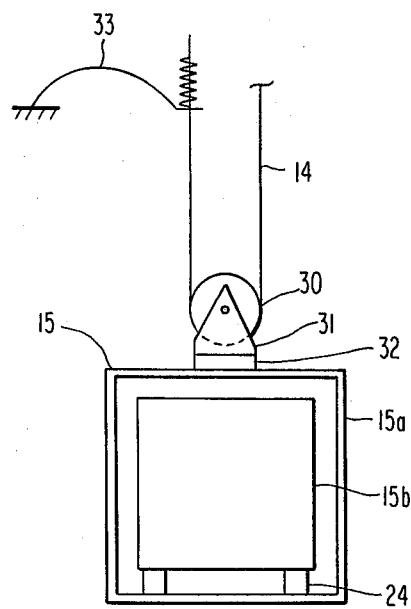
FIG. 4 is an explanatory diagram showing the essential parts of another example of the device according to the invention.

Another example of the device according to the invention is shown in FIG. 4, which is applied to an elevator having a roping of 2:1.

In FIG. 4, reference character 14 designates a main rope, one end of which is fastened to the machine room, wrapped around a lifting sheave 30 held in place by a bearing 31. The bearing 31 is fixedly secured through an insulator 32 to the cage frame 15a. A grounding line 33 is employed for grounding the main rope 14.

In this case, the shaft current flows through the main rope 14 and the grounding line 33. That is, there is no appreciable current flow in the bearings 7, 8, 12 and 13. Hence, the results are similar to the embodiment of FIG. 3.

Although the invention has been described with reference to the cases where a DC motor is used as the drive source, the technical concept of the invention can be applied to the case where an AC motor controlled by a thyristor converter is employed.

In this invention, as is apparent from the above description, the bearings supporting the traction sheave, the secondary sheave and the hoisting sheave are grounded through a resistor while the main rope is grounded without using a resistor. Therefore, the shaft current of the electric motor induced by the operation of the semiconductor switching will not substantially flow in the bearings, which positively protects the bearings from damage.

What is claimed is:

1. A system for grounding an elevator winder comprising: an electric motor controlled by a semiconductor switching element; a first rotary element coupled to said electric motor; a main rope wound on said first rotary element; bearings adapted to support said electric motor and said first rotary element; a first grounding circuit for grounding said bearings through a resistor; and a second grounding circuit for grounding said main rope without a resistor.

2. The system of claim 1 further comprising: a second rotary element on which said main rope is wound; bearings adapted to support said second rotary element, wherein said first grounding circuit grounds said bearings for said second rotary element through said resistor.

3. A system as claimed in claims 1 or 2, wherein said first rotary element is a traction sheave.

4. A system as claimed in claim 2, in which said second rotary element is a secondary sheave.

5. A system as claimed in claim 2, in which said second rotary element is a hoisting sheave.

6. A system as claimed in claim 1 wherein said semiconductor switching element is a thyristor system.

7. A system as claimed in claim 1 further comprising a support stand, said bearings disposed on said support stand to support said first rotary element and said first grounding circuit comprising said stand, said resistor and a coupling to ground.

8. A system as claimed in claims 1, 2 or 7 wherein said second grounding circuit comprises a conductive coupling between said main rope and ground.

* * * * *